(12) United States Patent
Weston et al.

(10) Patent No.: US 7,891,109 B2
(45) Date of Patent: Feb. 22, 2011

(54) CONTACT SENSING PROBE

(75) Inventors: Nicholas John Weston, Peebles (GB); James Fergus Robertson, Hawick (GB)

(73) Assignee: Renishaw PLC, Wotton-Under-Edge (GB)

( * ) Notice: Subject to any disclaimer, the term of this patent is extended or adjusted under 35 U.S.C. 154(b) by 128 days.

(21) Appl. No.: 12/227,073

(22) PCT Filed: May 8, 2007

(86) PCT No.: PCT/GB2007/001663
§ 371 (c)(1),
(2), (4) Date: Nov. 6, 2008

(87) PCT Pub. No.: WO2007/129071
PCT Pub. Date: Nov. 15, 2007

(65) Prior Publication Data
US 2009/0165318 A1    Jul. 2, 2009

(30) Foreign Application Priority Data
May 8, 2006    (GB) ................................. 0609022.9

(51) Int. Cl.
*G01B 5/012* (2006.01)
(52) U.S. Cl. .......................................... 33/561; 33/558
(58) Field of Classification Search ........... 33/559–561, 33/556, 558, 558.01, 558.3, 549–551, 503
See application file for complete search history.

(56) References Cited

U.S. PATENT DOCUMENTS

| | | | |
|---|---|---|---|
| 4,397,188 A | 8/1983 | Bansevichus et al. | |
| 5,018,280 A * | 5/1991 | Enderle et al. | 33/832 |
| 5,247,751 A | 9/1993 | Ohya et al. | |
| 5,323,540 A | 6/1994 | McMurtry et al. | |
| 7,367,132 B2 * | 5/2008 | Mitsuhashi | 33/556 |
| 7,546,690 B2 * | 6/2009 | Groell et al. | 33/558 |
| 7,647,706 B2 * | 1/2010 | Jordil et al. | 33/503 |
| 2005/0116583 A1 | 6/2005 | Nishio et al. | |
| 2009/0100693 A1 * | 4/2009 | Weston et al. | 33/561 |

FOREIGN PATENT DOCUMENTS

DE    4001981 A1    7/1990

(Continued)

OTHER PUBLICATIONS

Harb et al., "Resonator-based touch-sensitive probe," *Sensors and Actuators*, vol. 50, pp. 23-29, 1995.

*Primary Examiner*—Yaritza Guadalupe-McCall
(74) *Attorney, Agent, or Firm*—Oliff & Berridge, PLC (57) ABSTRACT

Contact sensing probe apparatus includes a workpiece contacting stylus, a transducer mechanically coupled to the stylus and an oscillator for supplying an alternating current to the transducer to induce vibration of the stylus. A contact sensor is also provided for monitoring the phase difference between the voltage supplied to the transducer and the current flow to the transducer. The oscillator is arranged to supply the transducer with an alternating current of a first frequency during contact sensing. This first frequency is selected to induce mechanical resonance but to be away from the maximum of the mechanical resonance peak. The probe may be used with co-ordinate positioning machines, such as portable articulated measuring arms, co-ordinate measuring machines (CMM) and the like.

21 Claims, 5 Drawing Sheets

FOREIGN PATENT DOCUMENTS

| | | |
|---|---|---|
| EP | 0 730 210 A1 | 9/1996 |
| FR | 2 484 631 A1 | 12/1981 |
| GB | 2 006 435 A | 5/1979 |
| GB | 2 070 249 A | 9/1981 |
| GB | 2 336 433 A | 10/1999 |
| JP | A-05-087507 | 4/1993 |

* cited by examiner

CONTACT SENSING PROBE

The present invention relates to a contact sensing or "touch" probe having a stylus that is vibrated during use. In particular, the invention relates to such a probe for use on co-ordinate positioning machines, such as portable articulated measuring arms, co-ordinate measuring machines (CMM) and the like.

Contact sensing probes are known. GB2006435 describes a touch probe having a contact element (e.g. a stylus) and a piezoelectric transducer for vibrating said contact element at its resonant frequency. A sensing circuit is also provided which detects engagement of the contact element with an object by sensing a parameter change in the electrical signal that is applied to or generated by the piezoelectric transducer.

U.S. Pat. No. 5,247,751 describes a further touch probe device. The device of U.S. Pat. No. 5,247,551 also comprises a transducer to which an RF signal is applied to induce ultrasonic vibration of an attached stylus at its resonant frequency. The electrical signal supplied to the piezoelectric transducer is monitored for a change that indicates the stylus has made contact with an object.

According to a first aspect of the present invention, contact sensing probe apparatus comprises a stylus, a transducer mechanically coupled to the stylus, an oscillator for supplying an alternating current to the transducer to induce vibration of the stylus, and a contact sensor for monitoring the phase difference between the voltage supplied to the transducer and the current flow to the transducer, wherein the oscillator supplies the transducer with an alternating current of a first frequency during contact sensing, characterised in that said first frequency is selected to induce mechanical resonance but to be away from the maximum of the mechanical resonance peak.

The present invention thus comprises a contact sensing or touch probe which comprises a stylus and a transducer (e.g. a piezo-electric transducer) that is mechanically coupled to the stylus. An oscillator (e.g. comprising a frequency synthesiser) is also provided to generate an alternating current (AC) signal which is used to drive the transducer. During contact sensing, the oscillator supplies the transducer with an alternating current having a first frequency thereby causing vibration of the stylus at that first frequency. A contact sensor is also provided for monitoring the difference in phase between the voltage (V) applied to the transducer and the current (I) passing to the transducer; i.e. the contact sensor monitors the so-called V/I phase difference. If the stylus makes contact with a surface, the resonant properties of the system are altered which damps or otherwise changes the characteristic vibration of the transducer thereby causing a detectable change in the V/I phase difference as measured by the contact sensor.

The probe has one or more natural vibration frequencies corresponding to one or more different modes of vibration. Mechanical resonance will thus occur whenever the transducer is driven at certain frequencies or modes of vibration. Previous vibrating contact probes of the type described in GB2006435 and U.S. Pat. No. 5,247,751 are driven at a frequency that is at the undamped (i.e. freely vibrating) resonant frequency; i.e. at a frequency that is as close as possible to the maximum in the undamped mechanical resonance peak. However, in accordance with the present invention, it has been found that driving the transducer at a frequency that induces resonance but is away from the maximum in natural frequency enhances the change in the V/I phase difference that occurs when the stylus of the probe contacts a surface. This has the advantage of providing a touch probe device having enhanced sensitivity compared to known devices.

Advantageously, the first frequency is selected to maximise the change in the phase difference between the voltage applied to transducer and the current passing through the transducer when the stylus contacts a surface. In other words, the first frequency is set so as to maximise the change in the V/I phase difference that is measured by the contact sensor when the stylus makes contact with a surface. The surface may be the surface of an object or workpiece to be measured, a reference surface etc.

Conveniently, the apparatus comprises a frequency setter or frequency setting means for implementing a set-up routine to determine the first frequency (i.e. the frequency that will be used during contact sensing). Advantageously, the frequency setter is arranged to control the oscillator so as to vary the frequency of the alternating current that is supplied to the transducer. The frequency setter may also be arranged to analyse the V/I phase difference between the voltage applied to transducer and the current passing through the transducer as a function of frequency. Conveniently, the first frequency is then selected by the frequency setter to equal a frequency that corresponds to an absolute maximum in the local gradient of the phase difference versus frequency characteristics of the stylus. Advantageously, the first frequency is selected to equal a frequency corresponding to at least one of a positive and negative local gradient in the V/I phase difference versus frequency characteristics.

In other words, the first frequency is preferably set at a frequency which is less than, or more than, the maximum in the natural frequency of vibration of the stylus and/or which corresponds to a region of maximum gradient in the V/I phase difference plot. This may be achieved by measuring the change in V/I phase difference between adjacent frequency steps as the frequency increases. If it is larger than the currently stored maximum value, the phase difference (and its associated frequency) are used to replace the stored maximum. The next frequency is then stepped to and the process repeated until the maximum frequency is reached.

Advantageously, the frequency setter is arranged to perform an initialisation frequency sweep over a first frequency range. This may be initiated by a user or automatically. For example the initialisation frequency sweep may be performed on power-up, on reset, after battery replacement, after a stylus change or if some kind of operation error is detected. The first frequency range may be wide and may encompass the whole operating range of the device (e.g. 15-35 KHz).

Conveniently, the frequency setter is arranged to perform a fine tune frequency sweep over a second frequency range, said second frequency range being narrower than said first frequency range. The second frequency range of the fine tune frequency sweep preferably encompasses the previously determined first frequency. The frequency steps used during the initialisation and fine tune frequency sweeps may be different, or the same, as required. The frequency steps may also be varied during the frequency sweep to maximise the accuracy with which the first frequency is determined whilst minimising the total time required to perform the frequency sweep.

The fine tune frequency sweep may thus be performed to re-calculate the first frequency that is to be used for contact sensing. This may be necessary if there have been any minor changes in the resonant frequency of the probe over time. As the first frequency has already been determined during the initialisation frequency sweep, the fine tune frequency sweep can be over a much narrower frequency range. For example, the second frequency range may span 500 Hz and be centred about the previously determined first frequency. As the fine tune frequency sweep is performed over a much shorter frequency range than the initialisation frequency sweep, it is typically much quicker to perform. Such a fine tune operation may be performed periodically; for example, whenever the probe is brought out of a standby mode to take a measurement.

Advantageously, the contact sensor is arranged to compare the phase difference between the voltage applied to transducer and the current passing through the transducer to a threshold phase difference. The threshold phase difference value may be determined by the frequency setter when the first frequency is calculated. Typically, the threshold phase difference is set at a certain proportion of the V/I phase difference of the undamped stylus when vibrating at the first frequency. For example, for a positive gradient the threshold may be set at a value $4/180$ below the V/I phase difference value as determined by the frequency setter at the first frequency. The exact level of the threshold will depend on various probe and operating environment factors; too high a threshold may cause false triggers whereas too low a threshold may cause slight surface contacts or contacts with softer surfaces to be ignored. Furthermore, the threshold may be variable during use allowing, for example, the sensitivity to be increased whenever surface contact is expected.

Advantageously, the apparatus comprises a contact signal line, the contact signal line being enabled whenever the phase difference between the voltage applied to transducer and the current passing through the transducer drops below the threshold phase difference. The contact signal line thus provides a indication of when the stylus has made contact with a surface. An electrical connection may be provided between the contact signal line and the associated co-ordinate measurement arm or machine to which the probe is mounted; this allows the co-ordinate measurement apparatus to store or output positional data whenever surface contact is made.

The contact sensor may comprise an ammeter to measure the current flow to the transducer and a voltmeter to measure the voltage across the transducer. The ammeter may comprise a voltmeter to measure the voltage drop across a resistor in electrical series with transducer and oscillator. The sinusoidal voltage (V) and current (I) signal may be converted into square wave signals and the time delay between leading and/or trailing edges of such signals measured to determine the phase difference. The V/I phase difference may be expressed in absolute time intervals or as counts derived from a reference clock. The contact sensor may comprise a field programmable gate array (FPGA) which is configured to monitor the phase difference between the voltage and current related signals. The FPGA may also be programmed to implement the frequency setter and to control operation of the oscillator.

Advantageously, the transducer comprises at least one layer of piezo-electric material. Preferably, the transducer comprises a piezo-electric stack comprising at least two layers of piezo-electric material. Providing two or more layers in a stack reduces the maximum voltage that is required to impart a certain amount of movement. The piezo-electric stack may comprise two layers of piezo-electric material which sandwich a first electrode and have a pair of outer (commonly electrically connected) electrodes on their outermost surfaces.

Advantageously, the first frequency is selected to be in the ultrasonic frequency band. Conveniently, the first frequency is greater than 15 KHz, or greater than 20 KHz. Preferably, the first frequency is less than 40 KHz, less than 35 KHz or less than 30 KHz.

Preferably, the apparatus comprises a probe body and a releasably attachable stylus. The probe body may also contain the transducer, oscillator, contact sensor, batteries etc. The stylus may be screw mounted to a stylus mount of the probe body which is mechanically coupled to the transducer. Various styli having different lengths, stiffness etc may then be attached to the probe head as required. Advantageously, the shaft of the stylus has a hollow core. Providing additional mass within the hollow core allows mass to be effectively added to the tip of the stylus. Such mass is preferably attached only at the distal end of the hollow stylus core. Adding extra mass to the tip of the stylus lowers its axial natural frequency, and can thus be used to define the natural frequency of the stylus. For example, additional mass may be located within the hollow core to ensure the natural frequency is within the operable frequency range of the apparatus (e.g. below 35 KHz).

Various modes of vibration may occur at difference drive frequencies. Advantageously, the first frequency is selected to coincide with a longitudinal stylus resonance mode. Exciting longitudinal (axial), rather than transverse (radial), modes of vibration in the stylus is typically preferable for contact sensing application as the damping of such modes is not effected by the direction of contact.

A co-ordinate positioning machine may incorporate contact sensing probe apparatus of the present invention. The co-ordinate position machine may comprise a manual measuring machine (e.g. an articulating arm of the type described in EP0730210), a motorised CMM or a machine tool.

According to a second aspect of the invention, a method of configuring a vibrating probe that comprises a transducer mechanically coupled to a stylus is provided, the method comprising the steps of; (i) applying an alternating current to the transducer of the probe to cause the stylus to vibrate, (ii) monitoring the phase difference between the voltage applied to transducer and the current passing through the transducer, and (iii) determining a first frequency for driving the transducer during contact sensing operation, characterised in that step (iii) comprises determining a first frequency which induces mechanical resonance but is away from the maximum in the mechanical resonance peak.

Advantageously, step (iii) comprises the step of selecting a first frequency so as to maximise the change in the phase difference between the voltage applied to transducer and the current passing through the transducer when the stylus contacts an object. The frequency may be selected by analysing the V/I phase difference as a function of frequency in the manner described above. For example, one or more frequency sweeps may be performed to determine a positive or negative maximum in the local gradient in the V/I phase difference versus frequency characteristics of the undamped stylus.

Conveniently, the method also comprises the step (iv) of operating the vibrating probe to detect contact with a surface, wherein an alternating current drive signal of said first frequency is applied to the transducer during said touch sensing operation.

The invention will now be described, by way of example only, with reference to the accompanying drawings in which.

Figure 1:
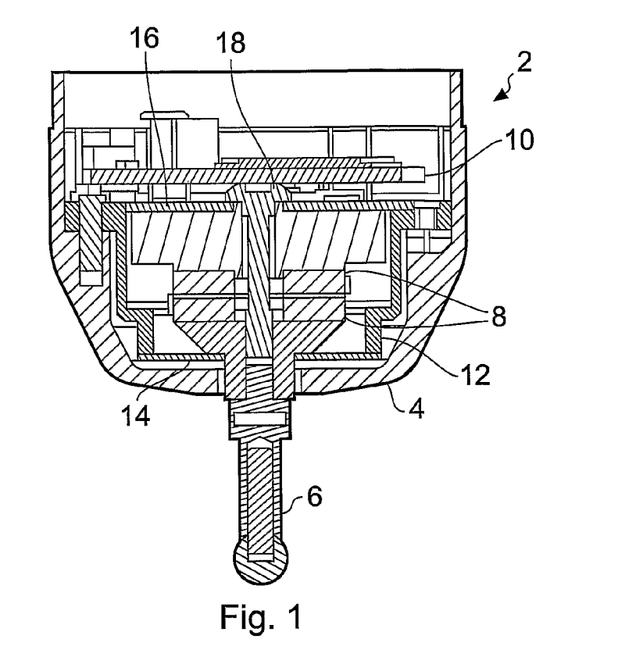
FIG. 1 shows a cross-section of a probe of the present invention.

Referring to FIG. 1, a probe 2 of the present invention is illustrated.

The probe 2 comprises a probe body 4 suitable for mounting on a co-ordinate positioning machine. In this example, the probe 2 is a manual scanning probe suited for mounting on a portable articulated measuring arm. The probe 2 comprises a releasably attachable stylus 6 and a piezo-electric stack 8 that is driven by drive circuitry 10. This arrangement allows the stylus 6 to be vibrated at a required frequency. The piezo-electric stack 8 and associated drive circuitry 10 are described in more detail below with reference to FIG. 2.

A casing 12 having a front diaphragm 14 and a rear diaphragm 16 are provided within the probe body 4. The casing 12 is arranged to be mechanically isolated from the piezo-electric stack 8. The piezo-electric stack 8 is connected to the probe body 4 via a bolt 18 passed through an aperture in the rear diaphragm 16. The stylus is connected to the piezo-electric stack 8 through an aperture formed in the front diaphragm 14. In this manner, the vibrating part of the apparatus can be mechanically isolated from the stationary probe body. The rapid expansion and contraction of the piezo-electric stack 8 can thus be converted into longitudinal vibration of the stylus with minimal associated vibration of the probe body taking place.

The mechanical vibration isolation aspects of the probe 2 are described in more detail in our co-pending International (PCT) Patent application that claims the priority of British patent application 0608998.1; the contents of which are hereby incorporated herein by reference.

Figure 2:
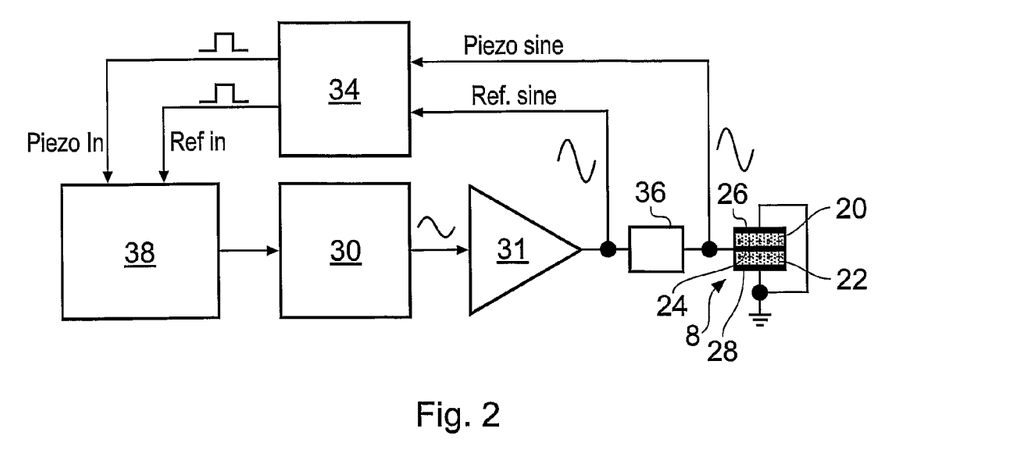
FIG. 2 illustrates the electrical circuitry used to drive the piezo-electric stack of the probe shown in FIG. 1.

Referring to FIG. 2, the electrical circuit used to drive the piezo-electric stack 8 is illustrated in more detail.

The piezo-electric stack 8 comprises a first layer of polarised piezo-electric material 20 and a second layer of polarised piezo-electric material 22. The first and second layers of piezo-electric material are arranged to sandwich a first electrode 24. Furthermore, the first and second layers of piezo-electric material 20 and 22 are each arranged so that their positively polarised surface (indicated by "+" in FIG. 2) is in contact with a first electrode 24. Outer electrodes 26 and 28 are located on the outermost (negatively polarised) surfaces of each of the first and second layers of piezo-electric material. The outer electrodes 26 and 28 are electrically connected to each other and are also grounded.

A frequency synthesiser 30 generates an alternating current (sine wave) signal which is amplified by amplifier 31 to provide an AC drive signal. Collectively, the frequency synthesiser 30 and amplifier 31 provide an oscillator or AC generator. The AC drive signal is passed to the first electrode 24 via a resistor 36. When an AC drive signal is applied to the first electrode 24, the piezo-electric stack 8 will be driven into vibration. The frequency synthesiser 30 is arranged to provide an AC drive signal having a variable frequency output thereby allowing the piezo-electric stack 8 to be vibrated at a drive frequency that induces a required vibration of the stylus.

The piezo-electric stack 8 also acts as a sensor. A voltage reference signal ("Ref. Sine") is split from the output of the amplifier 31 before the resistor 36. A voltage indicative of the current flowing through the piezo-electric stack 8 ("Piezo sine") is also measured at a point between the resistor 36 and the piezo-electric stack 8. The voltage reference signal (Ref. Sine) and the current flow signal (Piezo sine) are both passed to a zero-crossing detector 34 and converted into square wave signals "Ref In" and "Piezo In" respectively. The square wave signals "Ref In" and "Piezo In" are passed to a field programmable gate array (FPGA) 38 which comprises an embedded microprocessor core. The FPGA 38 also controls operation of the frequency synthesiser 30, and contains timer circuits (not shown) for measuring both the phase difference and the capacitance of the operator sensor as described below.

Referring to FIG. 3, operation of the FPGA 38 is described in more detail. As outlined above, signals indicative of the voltage (V) across, and the current (I) flowing through, the piezo-electric stack are converted to square waves using a zero-crossing detection circuit 34. These square waves are then input to the FPGA 38.

Within the FPGA 38, the "Ref. In" and "Piezo In" signals are synchronised to a master clock running at a much higher frequency than the input signals. On the rising edge of the "Piezo In" signal a counter is reset. The counter will then increment when "Ref. In" or "Piezo In" is at a "high" logic level until it is reset on the next rising edge of the "Piezo In" input. Each increment represents one clock cycle. The counter is latched on the falling edge of the "Ref. In" signal, giving an "effective count" in clock cycles.

Figure 3A:
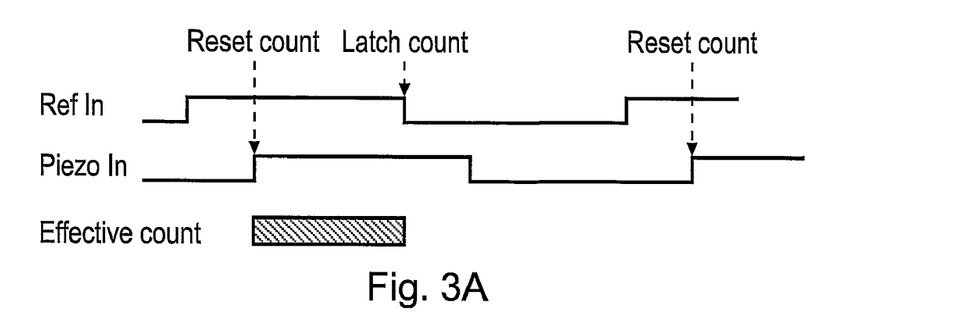
FIG. 3 illustrates how an effective count can be derived from applied voltage (V) and drive current (I) square wave signals.

As can be seen from FIG. 3A, the effective clock cycle count gives a measurement of the time delay or phase difference between the reference and the piezoelectric signals. In particular, FIG. 3A shows the phase relationship between "Ref. In" and "Piezo In" when the piezo-electric stack is driven at a frequency away from resonance. As the "Ref. In" and "Piezo In" signals are indicative of voltage (V) and current (I) respectively, the measured phase difference is also termed herein the V/I phase difference.

Figure 3B:
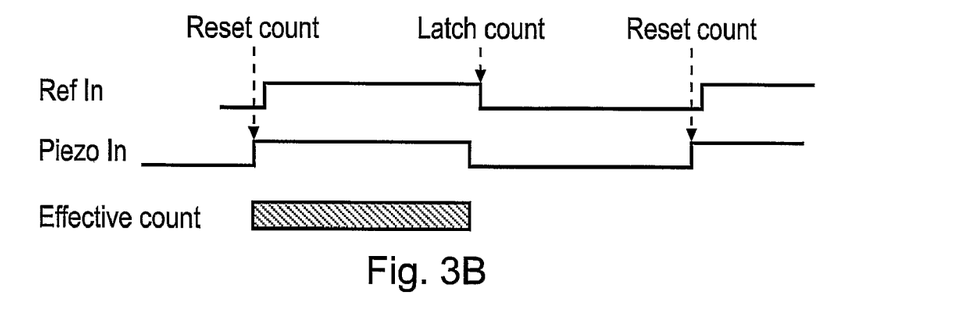

FIG. 3B illustrates the phase relationship that occurs when the phase of "Piezo In" has shifted in relation to the "Ref. In" signal due to the drive frequency approaching a mechanical resonance frequency. At such a mechanical resonance frequency, it can be seen that the V/I phase difference (i.e. the effective count) is maximised.

As outlined above, FIG. 3 illustrates resetting the signal counter on the rising edge of the "Piezo In" signal and latching the counter on the falling edge of the "Ref. In" signal. It should, however, be noted that it is also possible to reset the signal counter on the rising edge of the "Ref. In" signal and latch the counter on the falling edge of the "Piezo In" signal. This also produces a count value that is indicative of the V/I phase difference.

On startup or reset, the frequency synthesiser 30 is arranged to perform an initial frequency sweep. This enables the V/I phase difference to be established as a function of the frequency of the AC drive signal applied to the piezo-electric stack.

Figure 4:
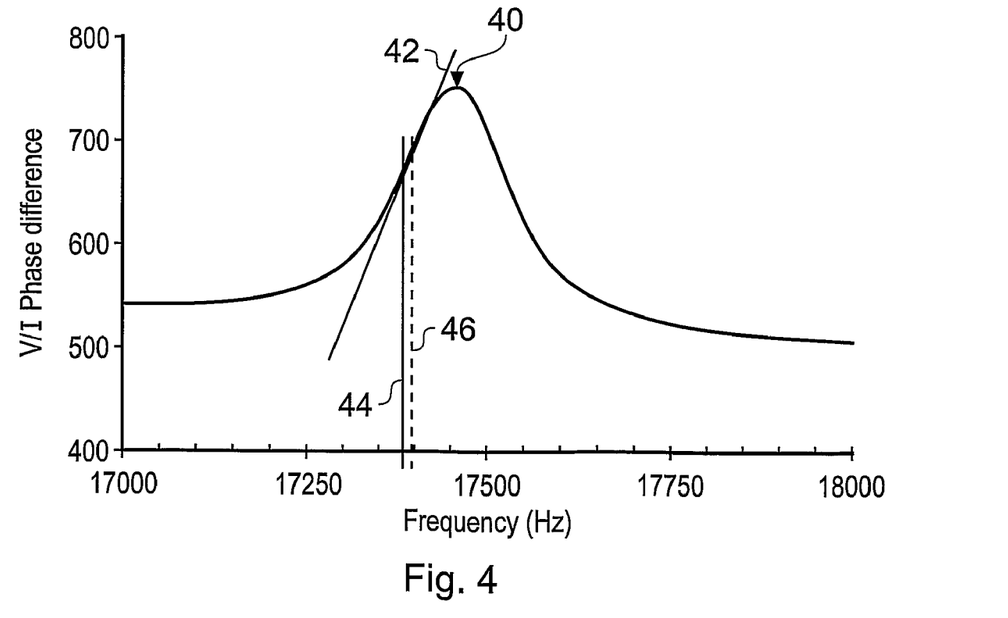
FIG. 4 shows the V/I phase difference as a function of the frequency of the drive signal applied to the probe of FIG. 1.

Referring to FIG. 4, the voltage-current (V/I) phase difference is shown as a function of the frequency of the drive current that is applied to the piezo-electric stack 8. Although the initial frequency sweep is typically performed across a broad frequency range (e.g. 15-35 KHz), FIG. 4 only shows, for clarity, the V/I phase difference across the frequency range of 17-18 KHz. It can be seen that a peak 40 in the V/I phase difference occurs that coincides with a resonant frequency of the structure.

Around the resonant peak 40, large changes in V/I phase difference occur for small changes in frequency. The device comprises a drive frequency setter to determine the frequency at which the gradient of the curve around the point of inflection associated with the resonant peak is positive and at a maximum; this frequency is deemed the optimum drive frequency and is shown as line 44. The gradient of this region is also illustrated by line 42. The oscillator is then set to apply an AC drive signal to the piezo-electric stack having a first drive frequency. This first drive frequency is set to be equal, or as close as possible, to the optimum drive frequency. In this example, the frequency synthesiser 30 can only be set in 5 Hz steps and the frequency step closest to the optimum drive frequency is thus set as the first drive frequency (shown as line 46). The FPGA 38 may be configured to implement the drive frequency setter or such means may be implemented by a separate processor.

As outlined above, when the vibrating stylus contacts a surface, the piezo-electric stack oscillations are damped or otherwise change their characteristic mode of vibration. This alters the impedance of the piezo-electric stack thereby producing a measurable change in the V/I phase difference.

Figure 5:
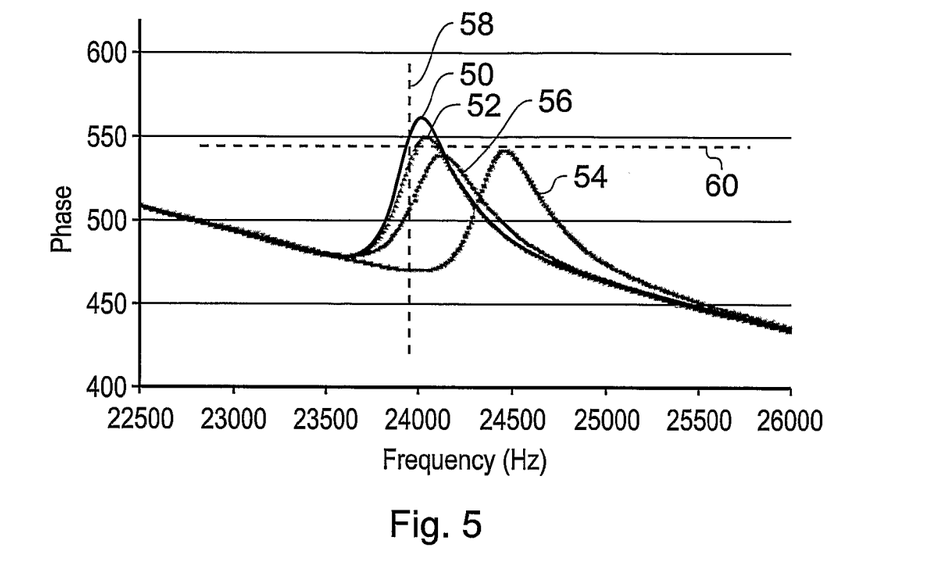
FIG. 5 shows the effect on the I-V phase difference when the probe contacts various surfaces.

FIG. 5 shows the V/I phase difference characteristics as a function of drive frequency for probes in free space or in contact with different surfaces. Curve 50 of FIG. 5 illustrates the V/I phase characteristics of an undamped probe (i.e. a probe having a stylus that is freely vibrating in air). Curve 52, curve 54 and curve 56 illustrate the V/I phase difference characteristics for the same probe having a stylus that is in contact with plasticine, metal and plastic respectively. It should be noted that the probe from which the data of FIG. 5 is acquired has a different natural frequency to the probe that is described above with reference to FIG. 4.

In use, the oscillator is arranged to vibrate the probe at the first drive frequency as determined by the frequency setter; this first drive frequency is illustrated by dashed line 58. A V/I phase threshold (illustrated by dashed line 60) is also set at a level just below the V/I phase difference that was measured for the undamped probe at the first drive frequency. It can be seen that any significant damping of the probe (e.g. as illustrated by any one of curves 52, 54 and 56) causes the V/I phase difference to drop below the V/I threshold thereby providing an indication that the stylus has made contact with a surface. When the V/I phase difference drops below this threshold, the probe stylus is deemed to be in contact with a surface and a contact signal line is enabled to instruct the associated measurement arm to take positional data points. If the V/I phase difference is above the threshold, the contact signal line is disabled.

The threshold is set empirically to give enough sensitivity but to avoid false triggers. Setting the touch threshold count too high could result in the probe being oversensitive, with the possibility of generating false triggers. Conversely, setting it too low could reduce the sensitivity of the probe which may mean it is unable to measure contact with certain softer materials (e.g. plasticine). In this example, the measured average phase count is measured and multiplied by a factor of $4/180$. This factor corresponds to a four degree phase change; the resulting $4/180$ phase count value is subtracted from the measured average phase count and becomes the touch threshold count. The measuring process uses this touch threshold count value to determine whether or not the probe is in contact with a surface.

As described with reference to FIG. 4, the probe performs a initial broad frequency sweep (e.g. over 15-35 KHz) to establish the optimum drive frequency. Once this broad sweep has been completed, subsequent frequency sweeps over a narrower frequency range (e.g. over a range of 500 Hz) may be performed as necessary to re-measure or fine-tune the optimum drive frequency when required.

In this example, the probe is also arranged to go into a sleep mode if it remains powered but is not actually in use. In sleep mode the piezo-electric drive voltage and the phase monitoring cease and an operator sensor is monitored.

The operator sensor comprises a capacitive sensor which is used to sense when the operator is touching the probe. A simple pulse generator supplies the FPGA 38 with pulses at a frequency dependent on the charging time of a resistor-capacitor network. The capacitor is in the shape of a flexible circuit board, containing two parallel copper tracks on one side and no copper on the other, that is wrapped round the probe body. The tracks are insulated from the body via its plastic casing and from the operator via the circuit board material. One is connected via a wire to a sense input to the generator, the other is connected via a wire to probe ground. An aluminium label covers the circuit board side with no copper. The label, via conductance, maximises the effect of the operator over the copper tracked ring sensor.

When the operator touches the label, the capacitance of the operator to ground changes the overall capacitance connected to the pulse generator. This results in a lower frequency pulse output. On start up the FPGA measures the output frequency of the generated pulses in a similar way to how it measures the phase, by synchronising the pulses and counting their duration. A touch threshold is set to 125% of its current reading. When the measured count goes beyond this threshold count, it is assumed that the operator is holding the probe.

The above assumes that the operator is not holding the probe at "switch on". By adding a little more complexity to the software it is possible to make the system work with the probe being held at switch on. For example, at "switch on" the capacitance may be measured and two thresholds are calculated; one at 90% of the current measured pulse duration, the other at 125%, as before. The system goes through its initial tuning process and threshold setting as usual and then enters a state where it waits for a change in the operator sense count. A "Sleep" L.E.D is illuminated to indicate to the operator that the probe is not ready to measure yet. If the count goes beyond the upper threshold it is assumed that the probe was not being held, and normal operation will resume. If the count drops, it is assumed that the operator has noticed that the probe is not ready to measure and has now let go. The system will now re-calculate the threshold at 125% of the current measured value, ready for normal operation thereafter.

Although a capacitance sensor is described above, various other means may be used as an operator sensor to the same purpose. For example, a tilt switch, accelerometer, enable button or proximity sensor could used instead of the capacitance sensor.

Figure 6:
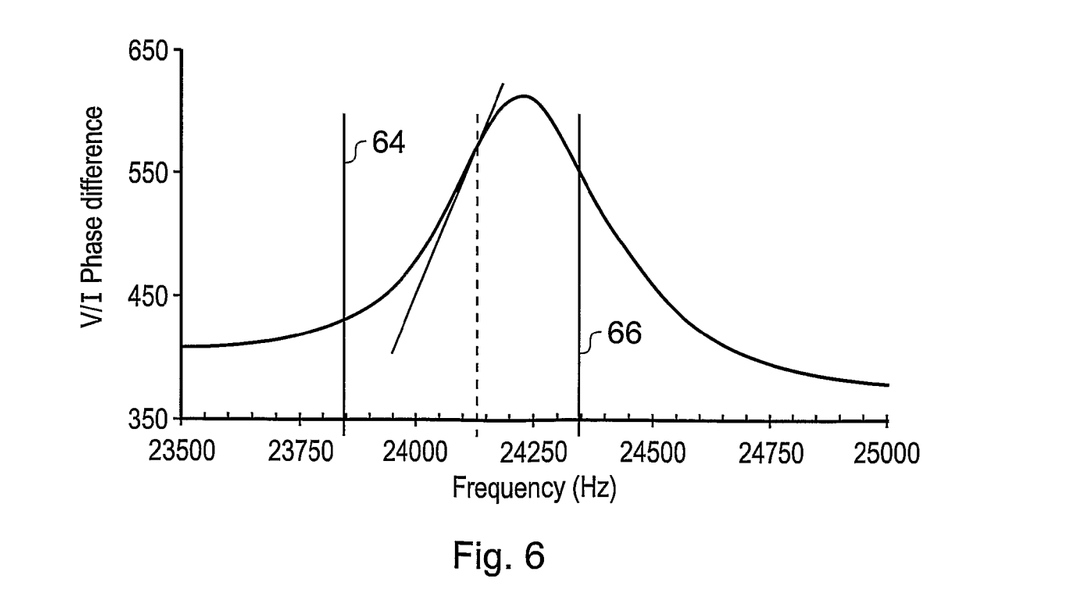
FIG. 6 illustrates fine tuning the vibrational frequency of the probe.

On sensing an operator during "sleep" mode, a much shorter frequency sweep of the stack can then be made over a fraction of the full frequency range and centred about the previously determined optimum drive frequency. An example of such a short or "fine-tune" frequency sweep is shown in FIG. 6 where lines 64 and 66 indicate the lower and upper fine tune frequency limits respectively. Typically, this narrow frequency sweep will be performed within the time it takes the operator to grasp and position the probe.

A power down arrangement of this type will reduce power consumption, thereby conserving battery life, whilst maintaining the accuracy of the probe. Such an arrangement is, however, by no means essential. If power consumption is not an issue, or if continual use of the probe is required, the sleep mode may be disabled or omitted from the probe apparatus.

The mechanical and electrical characteristics of the piezo-electric stack, and therefore the generator, may change with temperature. This may be compensated for by performing short re-tunes whenever the probe is grasped by a user. More details concerning temperature compensation can be found in our International (PCT) Patent application that claims the priority of British patent application 0608999.9, the contents of which are hereby incorporated herein by reference.

Figure 7:
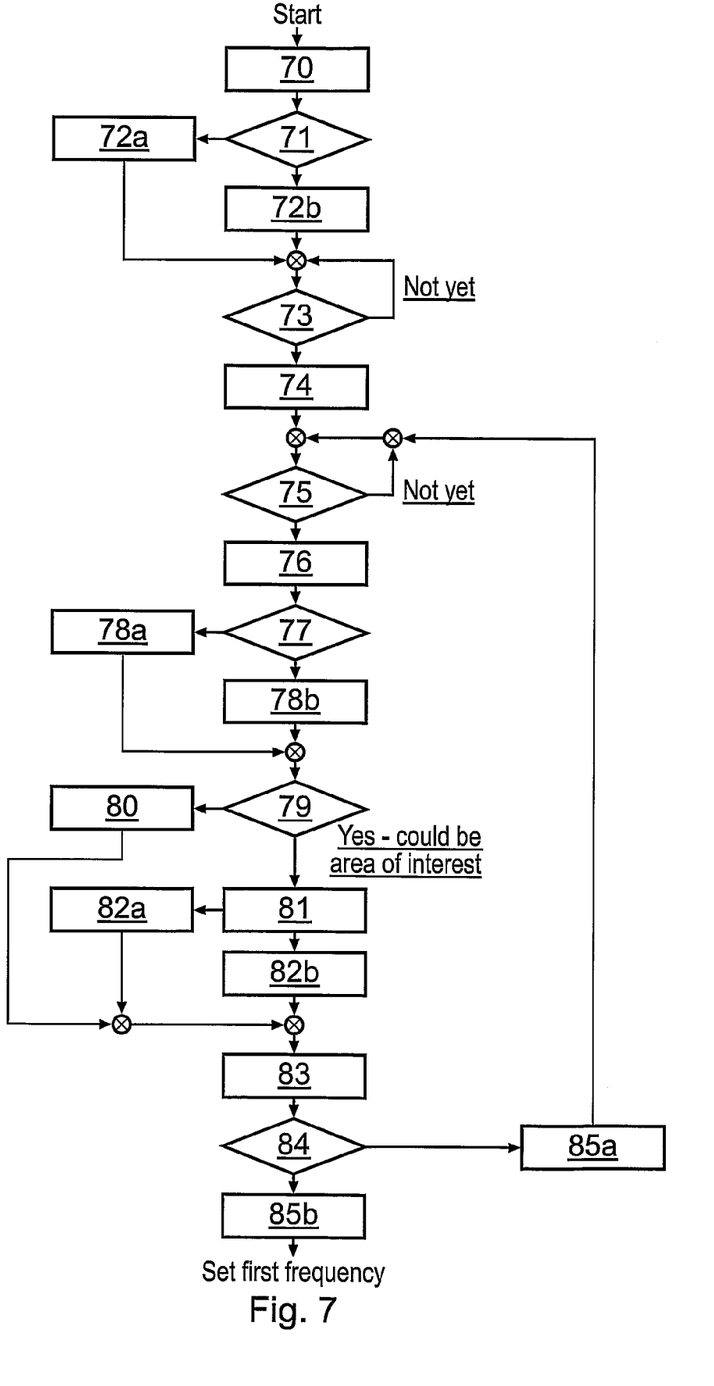
FIG. 7 is a flow chart illustrating how the frequency of operation of the probe apparatus is determined.

Referring to the flow diagram of FIG. 7, a method is described below for performing a frequency sweep to determine the first frequency that is to be used for contact sensing. It should be noted that the method described is used to find a maximum in the positive gradient.

Initially step 70 sets the size of the required frequency step to large. Step 71 determines whether a full frequency sweep or a short frequency sweep is required. When the probe is switched on, or reset, the full frequency sweep is selected and step 72(*b*) is processed. A short frequency sweep is selected in all other situations (e.g. after coming out of sleep mode) and step 72(*a*) is processed. Thus the start and end frequencies of the frequency sweep (start_freq and end_freq respectively) are set according to whether a broad or short sweep is required. The reference drive frequency is set to the start frequency.

Step 73 waits until an average V/I phase difference measurement is available. When such a measurement is available, step 74 stores the value as a previous phase count value (Previous_phase_count) and increments the reference drive frequency at which the piezo-electric stack is being driven by the required frequency step.

The main frequency sweep loop is how entered. Step 75 waits until an average V/I phase difference measurement is available at the new frequency. When available, step 76 stores the new phase count as the current phase count value (Current_phase_count) from which the previous phase count value (Previous_phase_count) is subtracted to derive the difference phase count value (Delta_phase_count).

Step 77 determines whether there are sufficient readings to perform a moving average gradient calculation. If not, step 78(*a*) adds the difference phase count value (Delta_phase_count) to the accumulator, increments the accumulator count and sets the current average gradient (Current_av_gradient) to zero. If sufficient readings are available, step 78(*b*): (i) averages the accumulator readings and stores the value as an average reading (av_rdg), (ii) adds the Delta_phase_count to the accumulator and subtracts the av_rdg value therefrom and (iii) stores the accumulator value as the Current_av_gradient value.

Step 79 checks whether the Current_av_gradient value determined in step 78(*a*), or (*b*), is less than zero. If the Current_av_gradient value is less than zero, the frequency corresponds to a negative gradient and is therefore of no interest (i.e. because a positive gradient region is desired in this example). In this case, step 80 sets the frequency step to be large and steps 83 and 84 are performed directly (i.e. without performing steps 81 and 82(*a*), or (*b*)).

If the Current_av_gradient value is not negative the presently set oscillator drive frequency could correspond to an area of interest. Step 81 is then performed to determine whether the Current_av_gradient value is greater than, or equal to, a stored previous value of maximum gradient (Max_gradient). If not, step 82(*a*) sets the frequency step size to small before performing step 83. If the Current_av_gradient value exceeds, or is equal to, the Max_gradient value, step 82(*b*) sets (i) the Max_gradient value to equal the Current_av_gradient value, (ii) the current drive frequency as the optimum drive frequency (optimum_freq_setting) (iii) the frequency step to be tiny. Step 83 saves the Current_phase count value as the Previous_phase_count value.

Step 84 compares the current reference drive frequency to the end frequency. If they are not equal, step 85(*a*) increments the reference drive frequency by the required step and the method is repeated from step 75. When the frequencies are equal, the sweep is complete. Step 85(*b*) then sets the first frequency (i.e. the frequency to be used during contact sensing) to equal the optimum_freq_setting value.

Although determining the maximum, positive, gradient in the V/I phase difference is described above it should be noted that the drive frequency setter and the associated frequency sweep method may alternatively be arranged to determine the frequency at which the gradient of the curve around the point of inflection associated with the resonant peak is negative and at a maximum. As can be seen from FIG. 5, if a frequency on the negative gradient is selected the V/I phase threshold should be set above the undamped V/I phase value measured in free space.

As a further alternative, the drive frequency setter and associated frequency sweep method could be arranged to determine the absolute maximum (i.e. sign independent) gradient. In the case of the absolute maximum gradient being found, the sign of the gradient associated with such a maximum can be used to indicate whether the V/I phase threshold should be higher, or lower, than the free space vibration phase; for a positive gradient the threshold should be lower whereas for a negative gradient a higher threshold is required.

The probe described above with reference to FIGS. 1 and 2 comprises a two layer piezoelectric stack 8. It should, however, be remembered that it is also possible for a single piezoelectric element to be provided.

Figure 8:
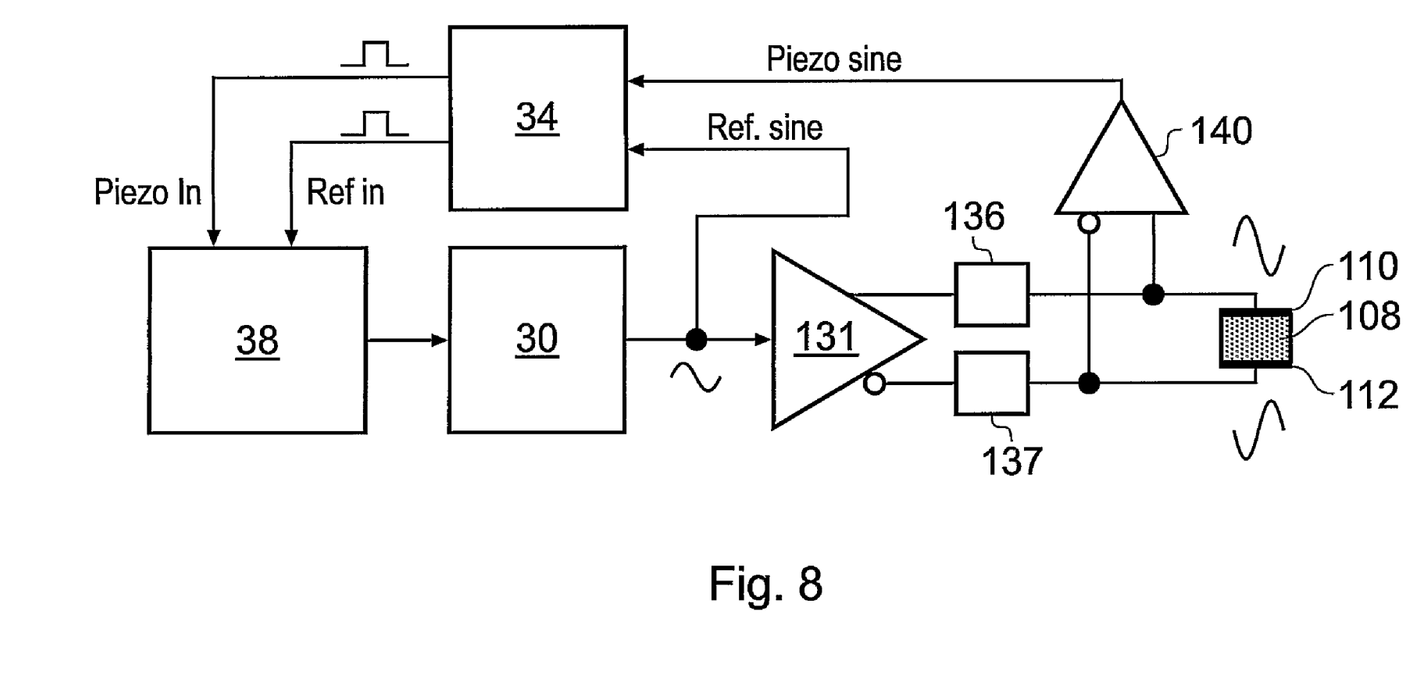
FIG. 8 illustrates the electrical circuitry used to drive a single piezo-electric element.

Referring to FIG. 8 an electrical circuit for driving a single piezo-electric is illustrated. Parts of the circuit that are analogous to those parts described with reference to FIG. 2 are assigned like reference numerals.

The circuit comprises a single piezoelectric element 108 sandwiched by electrodes 110 and 112. A frequency synthesiser 30 provides a sine wave output that is fed into a differential amplifier 131 to produce both inverted and non-inverted drive signals. The inverted drive signal is passed through a first resistor 136 to electrode 110 and used to drive a first side of the piezoelectric element. The non-inverted drive signal is passed through a second resistor 137 to electrode 112 and used to drive a second side of the piezoelectric element. The inverted and non-inverted drive signals both range in voltage from a maximum positive to a maximum negative voltage. Since the drive signals are the inverse of each other, both sides of the polarised element will expand and contract at the applied frequency in a sinusoidal movement. Thus the amount of movement is similar to the dual element piezo-electric stack described with reference to FIG. 2, where one side of each element is driven by a unipolar drive signal and the other is grounded.

A reference signal, "Ref. sine" from the frequency synthesiser 30 is input to the zero-crossing detector 34. The differential signals developed across the element are input to an instrumentation amplifier 140. The output of the amplifier 140 is a 'Piezo sine' signal that is also input to the zero-crossing detector 34. From this point, the processing of both 'Ref sine' and 'Piezo sine' is the same as described above. The advantages of using a single element are that the probe will be cheaper to produce and its length can be reduced. A multiple element piezo-electric stack has the advantage that less electronic components are required and that the piezo-electric element does not require insulating from the probe body. The type of piezo-electric element used in the probe can thus be selected as required for the particular application.

Although the above examples describe use of a probe for a manual positioning arm, it should be noted that such a probe could be used on any type of measuring machine. For example, a probe of the type described herein could be used on any manual measuring machine, motorised CMM or machine tool. In fact, such a probe could be advantageously used whenever low force contacting sensing is required. If motorised systems are used, the probe may further comprise an over-travel mechanism (e.g. a passive kinematic mount) which repeatably returns to a given location and orientation to prevent damage during contact sensing.

The invention claimed is:

1. A contact sensing probe apparatus comprising:
a stylus;
a transducer mechanically coupled to the stylus;
an oscillator for supplying an alternating current to the transducer to induce vibration of the stylus; and
a contact sensor for monitoring the phase difference between the voltage supplied to the transducer and the current flow to the transducer, wherein the oscillator supplies the transducer with an alternating current of a first frequency during contact sensing, said first frequency being selected to induce mechanical resonance but to be away from the maximum of the mechanical resonance peak.

2. The apparatus according to claim 1, wherein the first frequency is selected to maximise the change in the phase difference between the voltage applied to transducer and the current passing through the transducer when the stylus contacts a surface.

3. The apparatus according to claim 1, further comprising:
a frequency setter for implementing a set-up routine to determine the first frequency, the frequency setter being arranged to control the oscillator so as to vary the frequency of the alternating current that is supplied to the transducer.

4. The apparatus according to claim 3, wherein the frequency setter is arranged to analyse the phase difference between the voltage applied to transducer and the current passing through the transducer as a function of frequency, the first frequency being selected to equal a frequency corresponding to an absolute maximum in the local gradient of the phase difference versus frequency characteristics of the stylus.

5. The apparatus according to claim 4, wherein the first frequency is selected to equal a frequency corresponding to at least one of a positive and negative local gradient in the phase difference versus frequency characteristics.

6. The apparatus according to claim 3, wherein the frequency setter is arranged to perform an initialisation frequency sweep over a first frequency range.

7. The apparatus according to claim 6, wherein the frequency setter is arranged to perform a fine tune frequency sweep over a second frequency range, said second frequency range being narrower than said first frequency range.

8. The apparatus according claim 7, wherein the second frequency range of the fine tune frequency sweep encompasses the previously determined first frequency.

9. The apparatus according to claim 1, wherein the contact sensor is arranged to compare the phase difference between the voltage applied to transducer and the current passing through the transducer to a threshold phase difference.

10. The apparatus according to claim 9, further comprising:
a contact signal line, the contact signal line being enabled whenever the phase difference between the voltage applied to transducer and the current passing through the transducer drops below the threshold phase difference.

11. The apparatus according to claim 1, wherein the transducer comprises at least one layer of piezo-electric material.

12. The apparatus according to claim 11, wherein the transducer comprises a piezo-electric stack comprising at least two layers of piezo-electric material.

13. The apparatus according to claim 1, wherein the first frequency is greater than 15 KHz.

14. The apparatus according to claim 1, wherein the first frequency is less than 35 KHz.

15. The apparatus according to claim 1, further comprising a releasably attachable stylus.

16. The apparatus according to claim 1, wherein the shaft of the stylus has a hollow core.

17. The apparatus according to claim 16, wherein a mass is retained with said hollow core.

18. The apparatus according to claim 1, wherein the first frequency is selected to coincide with a longitudinal stylus resonance mode.

19. A method of configuring a vibrating probe that comprises a transducer mechanically coupled to a stylus, the method comprising the steps of:
(i) applying an alternating current to the transducer of the probe to cause the stylus to vibrate,
(ii) monitoring the phase difference between the voltage applied to transducer and the current passing through the transducer, and
(iii) determining a first frequency for driving the transducer during contact sensing operation,
wherein step (iii) comprises determining a first frequency which induces mechanical resonance but is away from the maximum in the mechanical resonance peak.

20. The method according to claim 19, wherein step (iii) comprises the step of selecting a first frequency so as to maximise the change in the phase difference between the voltage applied to transducer and the current passing through the transducer when the stylus contacts an object.

21. The method according to claim 19, further comprising:
(iv) operating the vibrating probe to detect contact with a surface, wherein an alternating current drive signal of said first frequency is applied to the transducer during said operation.

* * * * *